(12) United States Patent
Gozu

(10) Patent No.: US 12,472,690 B2
(45) Date of Patent: *Nov. 18, 2025

(54) MATERIAL SUPPLY DEVICE

(71) Applicant: SEIKO EPSON CORPORATION, Tokyo (JP)

(72) Inventor: Masayuki Gozu, Ina (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/819,343

(22) Filed: Aug. 29, 2024

(65) Prior Publication Data

US 2025/0074000 A1   Mar. 6, 2025

(30) Foreign Application Priority Data

Aug. 30, 2023  (JP) ................. 2023-139661

(51) Int. Cl.
| | |
|---|---|
| *B29C 64/321* | (2017.01) |
| *B29C 64/343* | (2017.01) |
| *B29C 64/393* | (2017.01) |
| *B33Y 50/02* | (2015.01) |

(52) U.S. Cl.
CPC .......... *B29C 64/321* (2017.08); *B29C 64/343* (2017.08); *B29C 64/393* (2017.08); *B33Y 50/02* (2014.12)

(58) Field of Classification Search
None
See application file for complete search history.

(56) References Cited

U.S. PATENT DOCUMENTS

| | | | |
|---|---|---|---|
| 2008/0277423 A1* | 11/2008 | Garton | B29C 41/38 222/561 |
| 2009/0004325 A1* | 1/2009 | Bacher | B29B 7/728 425/586 |
| 2014/0190084 A1 | 7/2014 | Schlagel | |
| 2020/0139629 A1 | 5/2020 | Yokota | |
| 2021/0060837 A1 | 3/2021 | Anegawa | |

(Continued)

FOREIGN PATENT DOCUMENTS

| | | | | |
|---|---|---|---|---|
| GB | 2523313 | | 8/2015 | |
| GB | 2523313 A | * | 8/2015 | ........... B65D 90/587 |
| JP | 2010-241016 | | 10/2010 | |

(Continued)

*Primary Examiner* — Armand Melendez
(74) *Attorney, Agent, or Firm* — Workman Nydegger

(57) ABSTRACT

The material supply device includes a material reservoir that has a supply port and that stores a plasticization material and a supply mechanism that adjusts the amount of plasticization material supplied from an input port to the outside, wherein the supply mechanism includes a sliding member that is provided between the supply port and the input port and in which is provided a through hole, and a slide drive section that slides the sliding member along an intersecting direction that intersects the supply direction, the supply mechanism switches to a first state and to a second state, the through hole of the sliding member communicates with the input port in both the first state and the second state, and a distance between the through hole and the supply port in the intersecting direction decreases in the order of the first state and the second state.

9 Claims, 14 Drawing Sheets

(56) References Cited

U.S. PATENT DOCUMENTS

2022/0055275 A1    2/2022  Maruyama
2022/0402210 A1   12/2022  Gozu

FOREIGN PATENT DOCUMENTS

| JP | 2011-011435 | 1/2011 |
| JP | 2021-035736 | 3/2021 |
| JP | 2022036539  | 3/2022 |
| JP | 2022191647  | 12/2022 |
| WO | 2009/100919 | 8/2009 |

* cited by examiner

MATERIAL SUPPLY DEVICE

The present application is based on, and claims priority from JP Application Serial Number 2023-139661, filed Aug. 30, 2023, the disclosure of which is hereby incorporated by reference herein in its entirety.

BACKGROUND

1. Technical Field

The present disclosure relates to a material supply device.

2. Related Art

JP-A-2022-36539 discloses a supply mechanism for supplying a material to a plasticizing mechanism provided in an injection molding device or a three-dimensional molding device. The supply mechanism includes a housing configured to contain a material, and a rotating member that is housed in the housing and is rotatable along the inner edge of the housing. A through hole is formed in the rotating member. When the rotation member rotates and the through hole and an introduction port coupled to the plasticizing mechanism communicate with each other, the material is supplied to the plasticizing mechanism through the through hole and the introduction port.

In such a material supply device, it is required to suppress the occurrence of malfunctions in the material supply.

SUMMARY

According to a first aspect of the present disclosure, there is provided a material supply device including an input port and configured to supply a stored plasticization material from the input port to the outside. The material supply device includes a material reservoir that has a supply port provided at a position not overlapping with the input port in a supply direction of the plasticization material and that stores the plasticization material and a supply mechanism that adjusts the amount of plasticization material supplied from the input port to the outside, wherein the supply mechanism includes a sliding member that is provided between the supply port and the input port and in which is provided a through hole through which the plasticization material passes, and a slide drive section that slides the sliding member along an intersecting direction that intersects the supply direction, the supply mechanism switches to a first state in which the plasticization material is supplied to the outside and to a second state in which the plasticization material is not supplied to the outside, the through hole of the sliding member communicates with the input port in both the first state and the second state, and a distance between the through hole and the supply port in the intersecting direction decreases in the order of the first state and the second state.

DESCRIPTION OF EMBODIMENTS

A. First Embodiment

Figure 1:
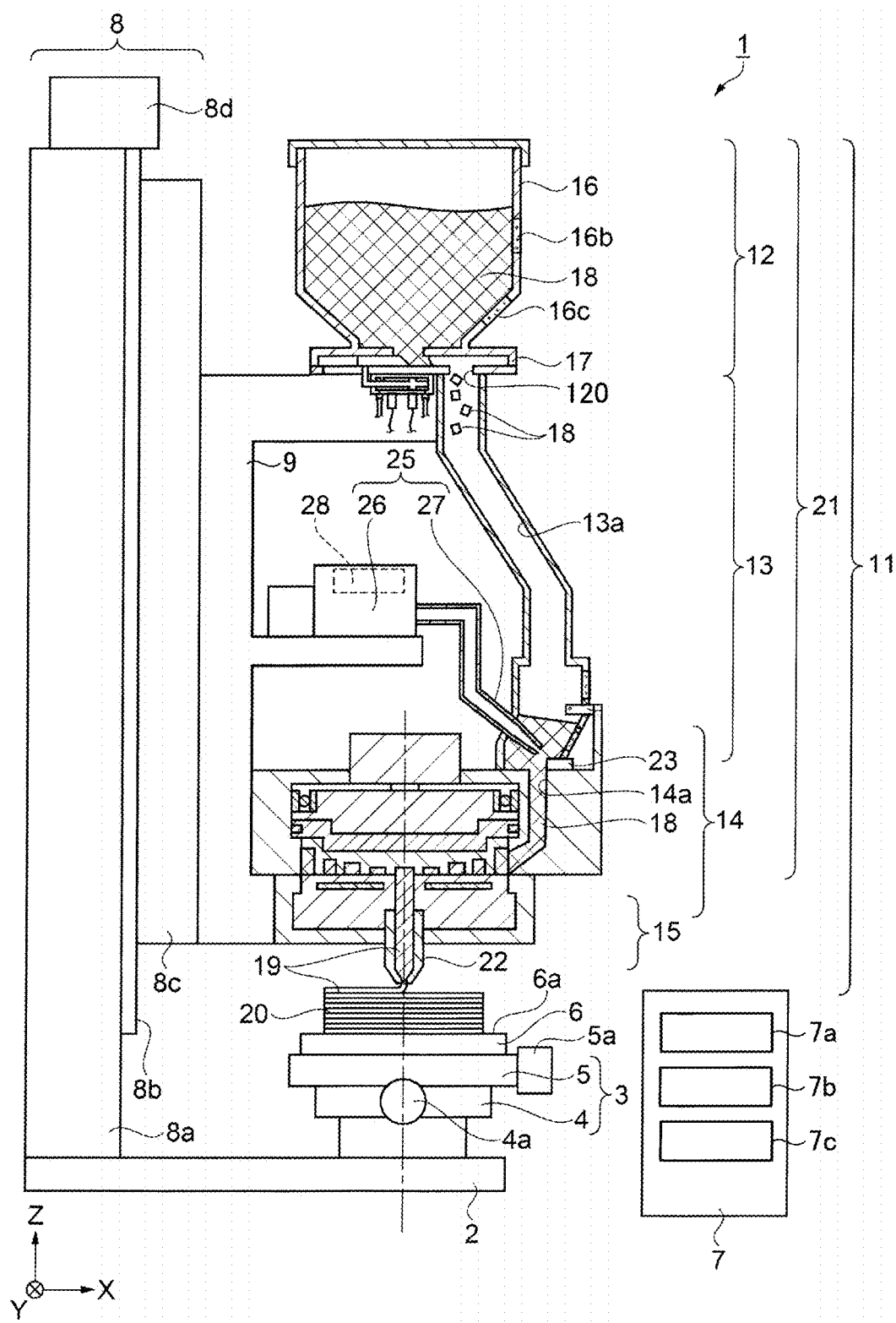
FIG. 1 is a schematic diagram illustrating a configuration of a three-dimensional molding device.

FIG. 1 is a schematic diagram illustrating a configuration of a three-dimensional molding device 1. In FIG. 1, arrows along X, Y, and Z directions orthogonal to each other are shown. The direction of the arrow is the + direction of each direction, and the opposite direction is the − direction. The terms "X direction", "Y direction", and "Z direction", when they are used without + or −, include both + and − directions. The X direction and the Y direction are directions along a horizontal direction, and the Z direction is a direction along a vertical direction. The −Z direction is the gravity direction and is a supply direction of the plasticization material. The X direction intersecting the supply direction is also referred to as an intersecting direction.

The three-dimensional molding device 1 includes a base 2. An X-Y table 3 as a moving section is installed on the base 2. The X-Y table 3 is configured by stacking and installing a Y-table 4 and an X-table 5 in this order in the +Z direction. A stage 6 is installed stacked on the X-Y table 3.

The Y-table 4 includes a Y-axis motor 4a, a ball screw, a Y-axial scale, and the like. The Y-table 4 moves the stage 6 in the Y direction. The X-table 5 includes an X-axis motor 5a, a ball screw, an X-axial scale, and the like. The X-table 5 moves the stage 6 in the X direction.

The three-dimensional molding device 1 includes a control section 7. The control section 7 is configured as a computer including a CPU and a storage section. The CPU controls each section of the three-dimensional molding device 1 by executing a program stored in the storage section. The control section 7 may be configured by circuitry.

The control section 7 controls the movement of the Y-table 4 and the X-table 5. The control section 7 recognizes the position of the stage 6 in the Y direction based on the information output from the Y-axial scale. The control section 7 recognizes the position of the stage 6 in the X direction based on information output from the X-axial scale. The control section 7 moves the Y-table 4 and the X-table 5 so as to eliminate the difference between the target position to which the stage 6 is moved and the current position. The control section 7 controls trajectory of the movement of the stage 6 by sequentially changing the target position to which the stage 6 is moved.

A raising/lowering table 8 as a moving section is installed on the base 2 on the +X direction side. The raising/lowering table 8 is provided with a fixed table 8a and the fixed table 8a stands on the base 2. A rail 8b is installed on the +X direction side surface of the fixed table 8a. A moving table 8c is installed on the +X direction side of the rail 8b. The moving table 8c is moved in the Z direction along the rail 8b.

A Z-axis motor 8d is installed on the +Z direction side of the fixed table 8a. The fixed table 8a includes a ball screw and a Z-axial scale therein. Similarly, as with the Y-table 4 and the X-table 5, the control section 7 controls the trajectory of the movement of the moving table 8c. The moving section includes the X-Y table 3 and the raising/lowering table 8.

A unit-support section 9 is installed on the +X direction side of the moving table 8c. A molding unit 11 is installed on the +X direction side of the unit-support section 9. The unit-support section 9 supports the molding unit 11. In the molding unit 11, a material supply device 12, a coupling tube 13, a plasticizing section 14, and an ejection section 15 are installed in this order in the −Z direction.

The material supply device 12 includes a material reservoir 16 having a cavity therein and a supply mechanism 17. A plasticization material 18 is stored in the material reservoir 16. "Plasticization material" refers to a material that is to be plasticized by the plasticizing section 14. The plasticization material 18 used in the present embodiment is a resin pellet that is a thermoplastic material. A resin pellet is a bulk of resin. The size of the resin pellets is not particularly limited, but is in the range of, for example, 5 mm to 20 mm in the present embodiment. The material reservoir 16 is also referred to as a hopper.

The supply mechanism 17 includes an input port 120 that communicates with the outside of the material supply device 12. The supply mechanism 17 adjusts a supply amount of the plasticization material 18 from the input port 120 to the outside. The coupling tube 13 is coupled to the input port 120. The coupling tube 13 includes a coupling path 13a therein. The supply mechanism 17 feeds the plasticization material 18 from the input port 120 to the coupling path 13a. The material reservoir 16 includes a first window 16b and a second window 16c. The first window 16b and the second window 16c are formed by a transparent material such as glass. The first window 16b is disposed on the +Z direction side of the material reservoir 16. The second window 16c is disposed on the −Z direction side of the material reservoir 16. The remaining amount of the plasticization material 18 in the material reservoir 16 is observed through the first window 16b and the second window 16c.

The control section 7 includes an operation panel 7a for a user to operate the three-dimensional molding device 1, a display device 7b for displaying an operation state or the like of the three-dimensional molding device 1, and a detection section 7c. The operation panel 7a includes, for example, a material replenishment button for refilling the material reservoir 16 with the plasticization material 18. When the material replenishment button is pressed by the user, a material replenishment command for setting the three-dimensional molding device 1 to a material replenishment mode in which the material can be replenished is transmitted from the operation panel 7a to the control section 7. The detection section 7c will be described later.

The plasticization material 18 moves from within the material supply device 12 into the coupling tube 13 by its own weight. The coupling tube 13 is coupled with the plasticizing section 14. In the present embodiment, the coupling tube 13 is formed of a conductive tube in order to prevent the generation of static electricity. The plasticizing section 14 includes a material inlet 14a communicating with the input port 120. The coupling path 13a couples the input port 120 and the material inlet 14a. The plasticization material 18 is supplied from the coupling tube 13 to the plasticizing section 14.

The plasticizing section 14 plasticizes at least a part of the plasticization material 18 to generate molding material 19. "Plasticization" is a concept including melting and is a change from a solid to a state having fluidity. Specifically, in the case of a material in which glass transition occurs, plasticization means that the temperature of the material is set to be equal to or higher than the glass transition point. In the case of a material in which glass transition does not occur, plasticization means that the temperature of the material is set to be equal to or higher than the melting point. In addition to the thermoplastic material, the plasticization material 18 may include other materials such as metals, ceramics, and the like. In a case where metal powder, ceramic powder, or the like is included in the plasticization material 18, not all of the plasticization material 18 is plasticized in the plasticizing section 14, and thus a portion of the plasticization material 18 is plasticized in the plasticizing section 14. The material supply device 12, the coupling tube 13, the plasticizing section 14, the control section 7, and the like constitute a plasticizing device 21.

The plasticizing section 14 is coupled to the ejection section 15. The ejection section 15 includes a nozzle 22. The stage 6 has a molding surface 6a. A surface of the stage 6 on the nozzle 22 side is the molding surface 6a. The nozzle 22 discharges the molding material 19 supplied from the plasticizing device 21 toward the molding surface 6a of the stage 6. The molding surface 6a of the stage 6 receives the molding material 19 discharged from the nozzle 22.

The control section 7 drives the X-Y table 3 to move the stage 6 in the X direction and the Y direction while the nozzle 22 discharges the molding material 19. By this, the three-dimensional molding device 1 forms a layer of a predetermined pattern on the stage 6. Next, the control section 7 drives the raising/lowering table 8 to move the molding unit 11 in the +Z direction by a predetermined distance. The control section 7 forms a three-dimensional molded object 20 by forming the second layer on the first layer and further sequentially forming the third and subsequent layers on the second layer.

The plasticizing section 14 is disposed below the material supply device 12 in the direction of gravity. The raising/lowering table 8 moves the plasticizing section 14 and the material supply device 12 relative to the stage 6. The raising/lowering table 8 moves the material supply device 12 in conjunction with the movement of the plasticizing section 14. According to this configuration, since the plasticizing section 14 and the material supply device 12 move in conjunction, deformation of the coupling tube 13 when the plasticizing section 14 and the material supply device 12 are moved is suppressed. Therefore, the coupling tube 13 can be shortened as compared with the case where the coupling tube 13 is deformed.

The X-Y table 3 moves the stage 6 in a direction along the molding surface 6a. The raising/lowering table 8 moves the plasticizing section 14 and the material supply device 12 in a direction perpendicular to the molding surface 6a. According to this configuration, the plasticizing section 14 and the material supply device 12 move in the direction of gravity and in the direction opposite to the direction of gravity. Since the plasticizing section 14 and the material supply device 12 have large inertia, it is possible to improve the operation speed of the three-dimensional molding device 1 compared to a case where the plasticizing section 14 and the material supply device 12 are moved along a plane orthogonal to the gravitational acceleration direction.

A material sensor 23 is disposed on the plasticizing section 14 side of the coupling path 13a. The material sensor 23 detects the presence or absence of the plasticization material 18 in the coupling path 13a. A method in which the material sensor 23 detects the plasticization material 18 is not particularly limited, and for example, an optical sensor having a light emitting section and a light receiving section can be adopted. In the present embodiment, the material sensor 23 outputs an ON signal to the control section 7 when the plasticization material 18 is detected, and outputs an OFF signal to the control section 7 when the plasticization material 18 cannot be detected.

The plasticizing device 21 includes a blower section 25 between the material supply device 12 and the plasticizing section 14. The blower section 25 is installed in the unit-support section 9. The blower section 25 is raised and lowered in conjunction with the plasticizing section 14 and the coupling tube 13. The blower section 25 includes a blower fan 26 and a blower nozzle 27. The blower fan 26 generates air flow and sends it to the blower nozzle 27. The blower nozzle 27 is installed facing the material sensor 23. The blower section 25 blows air from the blower nozzle 27 toward the material sensor 23. According to this configuration, it is possible to blow off the powdery plasticization material 18 and dust adhering to the material sensor 23. In addition, it is possible to prevent reduction in the sensitivity of the material sensor 23. The blowing may be performed continuously or at a predetermined interval.

The blower fan 26 includes an ionizer 28 therein. The ionizer 28 generates gas having a positive or a negative charge. Whether the charge of the gas is positive or negative is selectable. The ionizer 28 may alternately generate positive and negative charges. The blower section 25 blows the gas having an electric charge. According to this configuration, when the plasticization material 18 and dust in powder form become attached to the material sensor 23 by static electricity, it is possible to remove the charge and easily remove the plasticization material 18 and dust in powder form.

Figure 2:
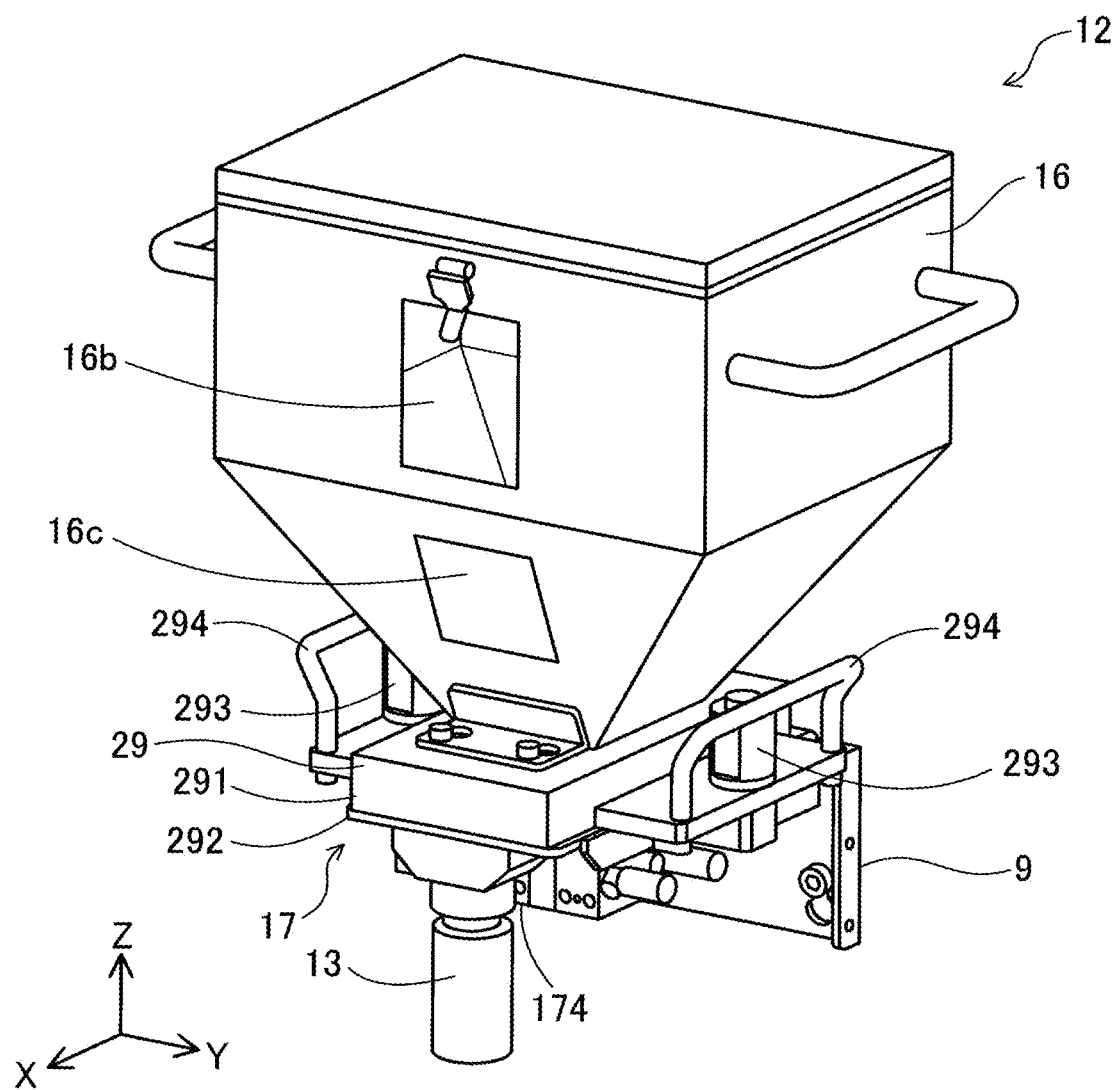
FIG. 2 is a perspective view showing a specific configuration of a material supply device.

FIG. 2 is a perspective view showing a specific configuration of the material supply device 12. The material supply device 12 includes the supply mechanism 17. The supply mechanism 17 includes a guide case 29. The inside of the guide case 29 is hollow. Inside the guide case 29, as will be described later, a sliding member is disposed. The guide case 29 includes a lid section 291 and a bottom section 292. The material reservoir 16 is fixed to the lid section 291 by bolts. The guide case 29 is coupled to the unit-support section 9 by a coupling device 293. The lid section 291 is provided with a handle 294. The user can detach the material reservoir 16 and the supply mechanism 17 from the unit-support section 9 by using the coupling device 293 to release the coupling state between the guide case 29 and the unit-support section 9 and holding the handle 294 to lift the lid section 291.

Figure 3:
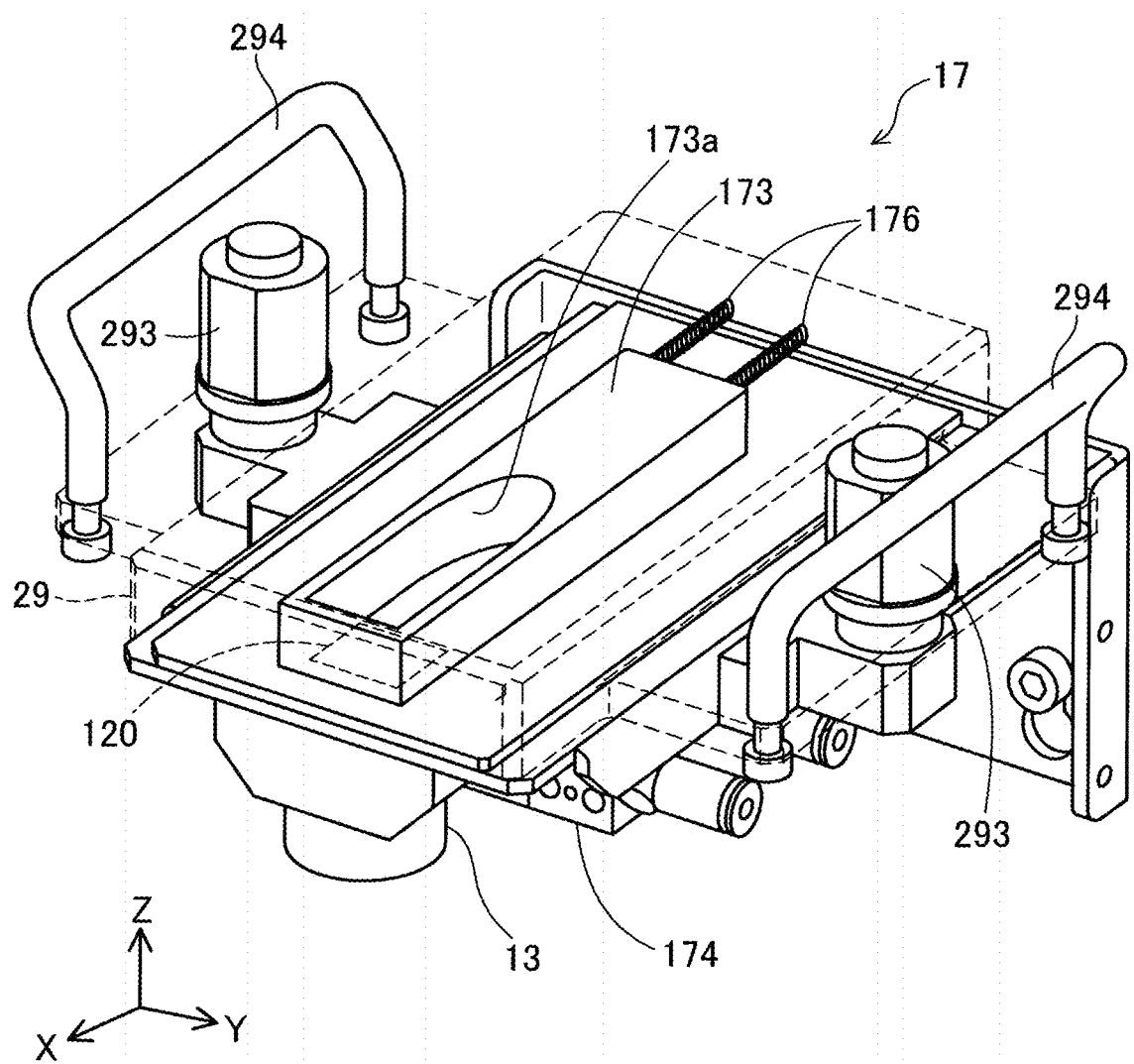
FIG. 3 is a perspective view showing the internal structure of the supply mechanism.
Figure 4:
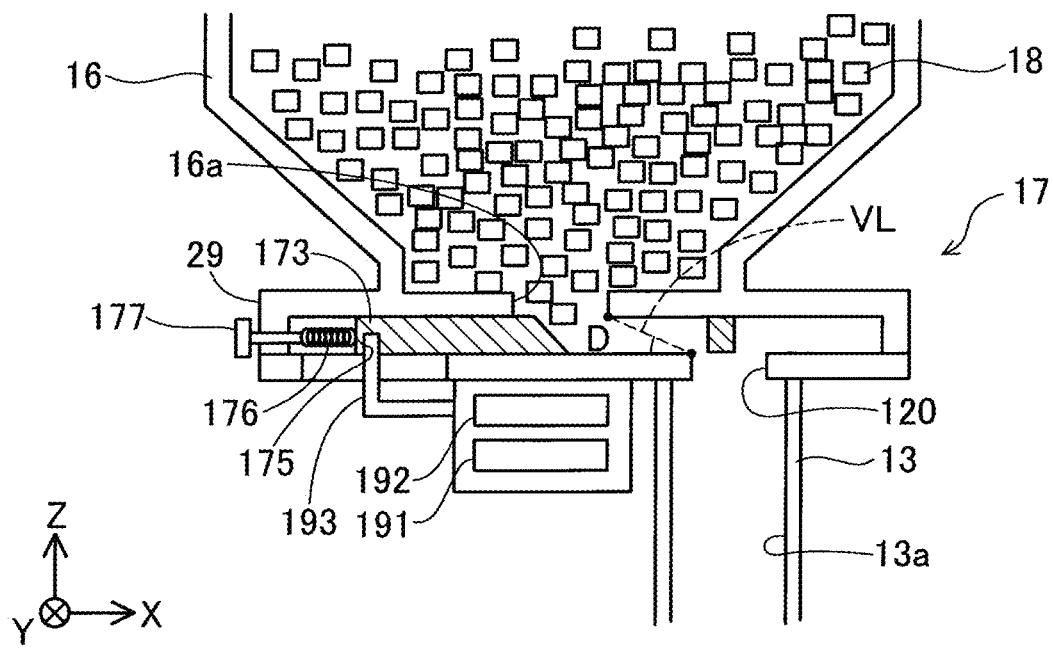
FIG. 4 is a side cross-sectional view schematically showing the internal structure of the supply mechanism.

FIG. 3 is a perspective view showing the internal structure of the supply mechanism 17. FIG. 4 is a side cross-sectional view schematically showing the internal structure of the supply mechanism 17. As shown in FIG. 3, the supply mechanism 17 includes a sliding member 173 and a slide drive section 174 for sliding the sliding member 173. The sliding member 173 functions as a material cutting plate that supplies a predetermined amount of the plasticization material 18 to the plasticizing section 14 through the coupling path 13a in the coupling tube 13. The sliding member 173 slides and reciprocates in the X direction inside the guide case 29. The sliding member 173 has a substantially rectangular parallelepiped shape with a longitudinal direction along the X direction. The sliding member 173 has a through hole 173a penetrating the sliding member 173 in the Z direction. The through hole 173a is surrounded by wall surfaces on all sides. The wall surface of the through hole 173a in the −X direction inclines downward. When the through hole 173a is viewed from above, the wall surface in the −X direction has a U-shape. The height of the through hole 173a, that is, the height of the sliding member 173, is, for example, the height of three to four pellets.

As shown in FIG. 4, the material reservoir 16 includes a supply port 16a on the bottom surface thereof. The supply port 16a communicates with the inside of the guide case 29. The guide case 29 is provided with the input port 120 on a surface on the coupling tube 13 side, that is, on a lower surface. The supply port 16a is provided at a position that does not overlap the input port 120 in the −Z direction, which is the supply direction of the plasticization material 18. In the present embodiment, the input port 120 is located on the +X direction side of the supply port 16a. Therefore, it is possible to suppress that the plasticization material 18 falls directly from the supply port 16a to the input port 120. The sliding member 173 is provided between the supply port 16a and the input port 120 in the Z direction.

In the X direction, an angle D formed by a virtual line VL, which connects an end of the input port 120 closest to the supply port 16a and an end of the supply port 16a closest to the input port 120 by the shortest distance, and a horizontal plane is set to an angle equal to or smaller than the smallest angle of repose of the plasticization material 18 that can be used in the three-dimensional molding device 1. Angle of repose refers to an angle between the horizontal plane and the slope of a pile of a material formed when the material is dropped from a certain height and that remains stable without spontaneously collapsing. This angle is, for example, 20 degrees or more and 35 degrees or less. By setting the angle D to be equal to or less than the angle of repose of the plasticization material 18, it is possible to suppress the flow of the plasticization material 18 into the input port 120 from the supply port 16a when the sliding member 173 is not moving.

The slide drive section 174 that slides the sliding member 173 along the X direction is installed on the −Z direction side of the guide case 29. The slide drive section 174 is fixed to the unit-support section 9. The slide drive section 174 includes an electric actuator having a motor 191 and a ball screw 192. The slide drive section 174 is controlled by control section 7. The motor 191 rotates the ball screw 192 and moves the sliding member 173 via a rod 193 which reciprocates along the X direction by the ball screw 192. The rod 193 is inserted from below into a hole section 175 formed in the lower surface of the sliding member 173. When the material reservoir 16 and the material supply device 12 are detached from the unit-support section 9, the rod 193 is pulled out from the hole section 175.

The sliding member 173 is coupled to a wall section of the guide case 29 on the −X direction side by a spring 176. When the material reservoir 16 and the material supply device 12 are detached from the unit-support section 9, the sliding member 173 is held at a position on the −X direction side by the tension of the spring 176. An adjustment bolt 177 capable of adjusting tension of the spring 176 from the outside of the guide case 29 is coupled to the spring 176.

As shown in FIG. 1, the control section 7 includes the detection section 7c. The detection section 7c detects the torque of the motor 191 by measuring the current value of the current flowing through the motor 191 of the slide drive section 174. The detection section 7c has a function of detecting the plasticization material 18 is interposed between the sliding member 173 and the guide case 29 based on the detected torque of the motor 191. The detection section 7c detects the remaining amount of the plasticization material 18 in the material reservoir 16 based on the detected torque of the motor 191. Details of these functions will be described later.

Figure 5:
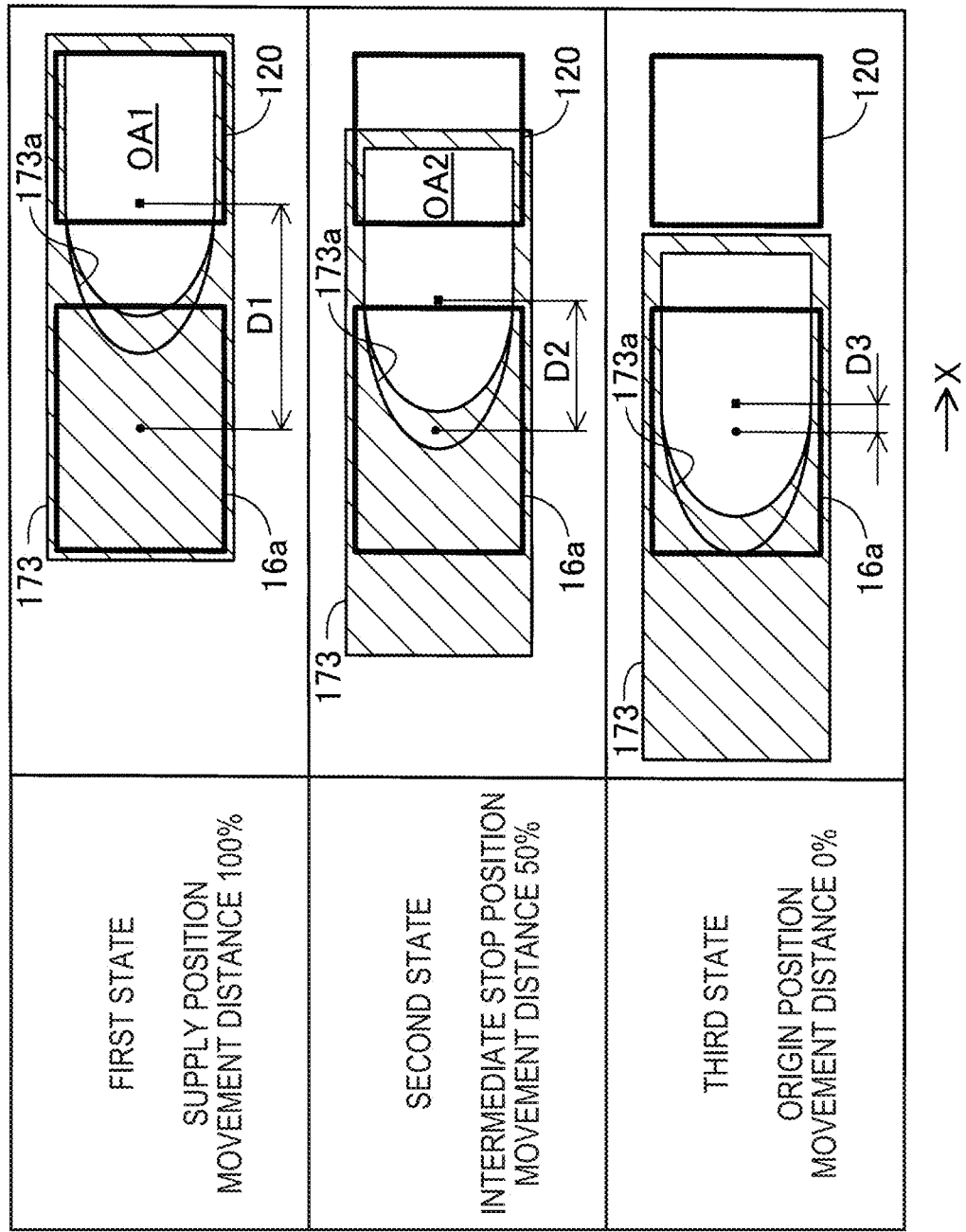
FIG. 5 is a diagram for explaining the operation of the supply mechanism.

FIG. 5 is a diagram for explaining the operation of the supply mechanism 17. In the present embodiment, the supply mechanism 17 is switched to a first state, a second state, and a third state. The first state is a state where the plasticization material 18 is supplied to the outside of the supply mechanism 17 through the input port 120. The second state is a state in which the plasticization material 18 is not supplied to the outside of the supply mechanism 17. The third state is a state in which the through hole 173a and the supply port 16a communicate with each other, and the through hole 173a and the input port 120 do not communicate with each other.

In this embodiment, the distance between the through hole 173a and the supply port 16a in the X direction is shortened in the order of the first state, the second state, and the third state. In FIG. 5, the distance between the center of the through hole 173a and the center of the supply port 16a in the first state is shown as a distance D1, the distance between the center of the through hole 173a and the center of the supply port 16a in the second state is shown as a distance D2, and the distance between the center of the through hole 173a and the center of the supply port 16a in the third state is shown as a distance D3. The distances D1, D2, and D3 decrease in this order. The measurement position of the distance D1, the distance D2, and the distance D3 are not limited to the center of the through hole 173a and the center of the supply port 16a, as long as the distance between the through hole 173a and the supply port 16a can be measured and it may be an arbitrary position. For example, the distance D1, the distance D2, and the distance D3 may be distances obtained by measuring, in the X direction, the distance between the position of the through hole 173a in the most-X direction and the position of the supply port 16a in the most-X direction.

As shown in FIG. 5, in the present embodiment, the through hole 173a of the sliding member 173 communicates with the input port 120 in both the first state in which the plasticization material 18 is supplied to the outside and the second state in which the plasticization material 18 is not supplied to the outside. Since the through hole 173a of the sliding member 173 is a hole surrounded by wall surfaces on all four sides, the area of the overlapping region OA1 where the through hole 173a and the input port 120 overlap each other in the first state is larger than the area of the overlapping region OA2 where the through hole 173a and the input port 120 overlap each other in the second state. Therefore, in the first state, the plasticization material 18 is easily discharged to the outside. The control section 7 controls the slide drive section 174 to alternately switch the state of the supply mechanism 17 between the first state and the second state. By the switching of the state, when the sliding member 173 reciprocates once, a predetermined amount of the plasticization material 18 is input from the input port 120 to the coupling path 13a. The control section 7 adjusts the amount of the plasticization material 18 to be charged into the coupling path 13a by controlling the number of times of reciprocating the sliding member 173 and the amount of reciprocating movement of the sliding member 173.

In the third state, the through hole 173a and the supply port 16a communicate with each other, but the through hole 173a and the input port 120 do not communicate with each other. Since the through hole 173a of the sliding member 173 is a hole surrounded by wall surfaces on all four sides, in the third state, the through hole 173a is closed, and the plasticization material 18 does not flow out from the through hole 173a. Therefore, when the material supply device 12 is to be detached from the unit-support section 9, the control section 7 moves the sliding member 173 in the −X direction and sets the state of the supply mechanism 17 to the third state.

The slide drive section 174 controls the movement of the sliding member 173 with the position of the sliding member 173 in the third state as the origin position. A state in which the sliding member 173 is moved 100% in the +X direction from the origin position is the first state. A state in which the sliding member 173 is moved by 50% in the +X direction from the origin position is the second state. The position of the sliding member 173 in the first state is referred to as a "supply position". The position of the sliding member 173 in the second state is referred to as an "intermediate stop position". When the sliding member 173 is in the intermediate stop position, for example, the distance along the X direction of the overlapping region OA2 where the through hole 173a and the input port 120 overlap is a distance of three or more pellets.

Figure 6:
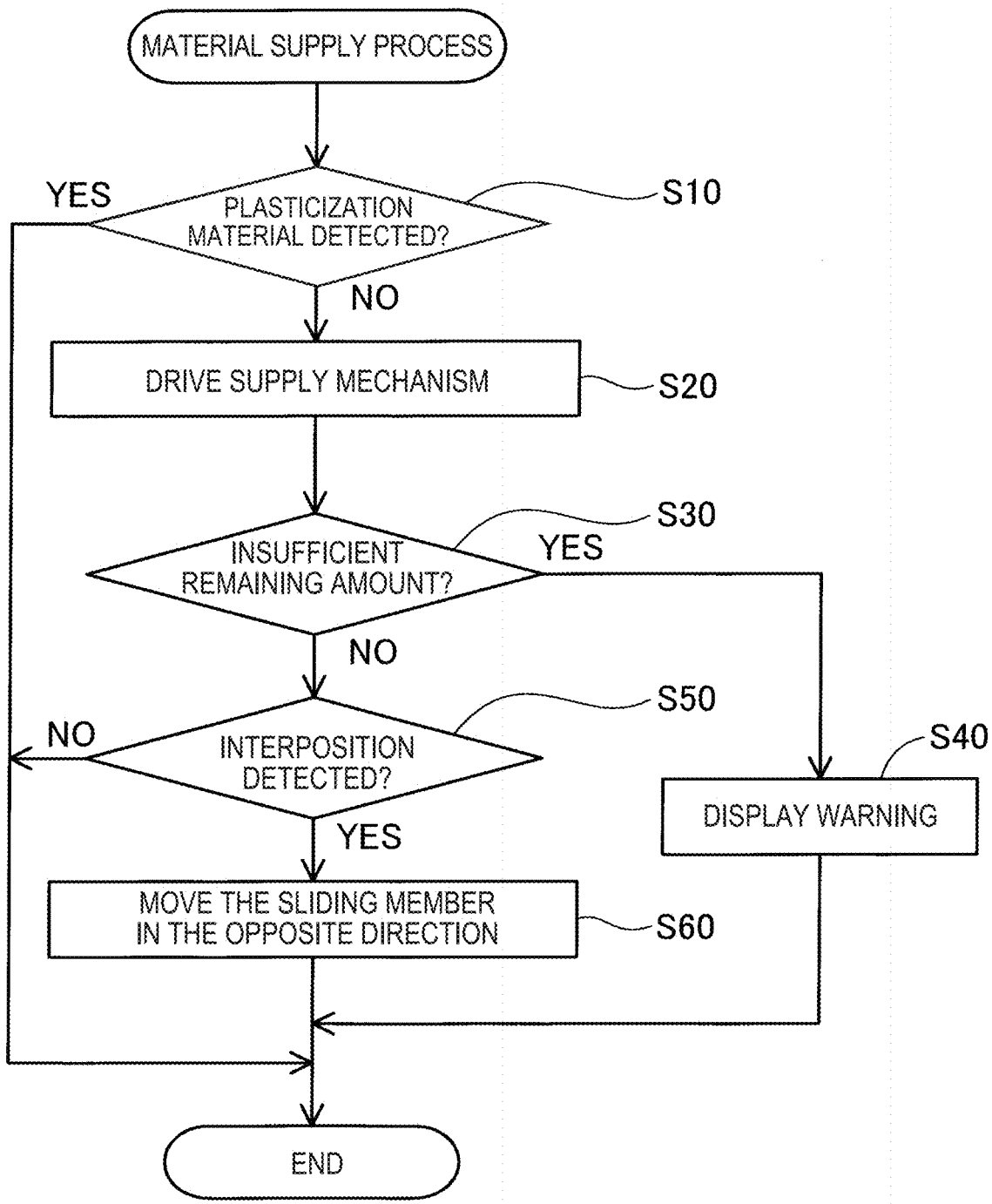
FIG. 6 is a flowchart of the material supply process.
Figure 7:
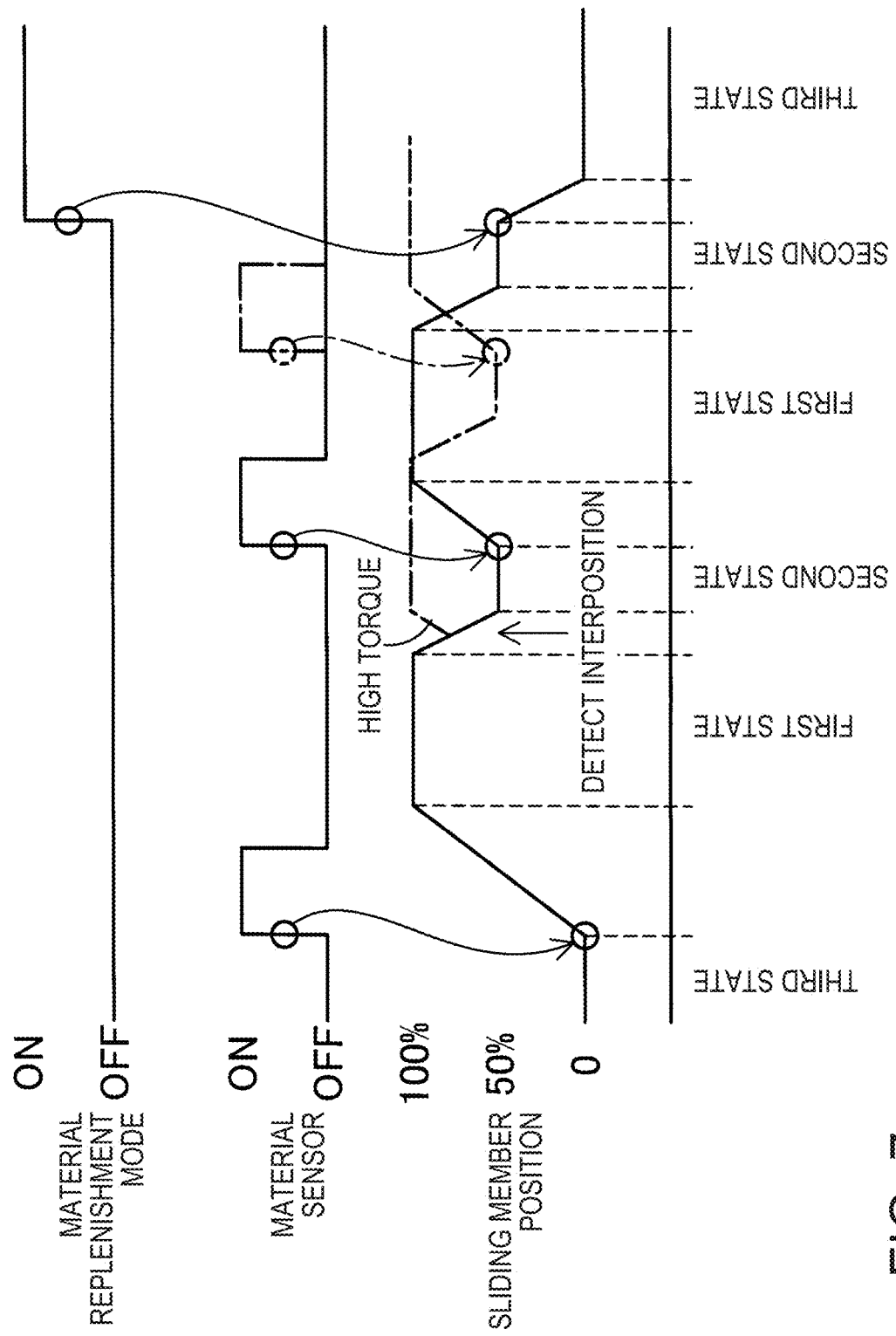
FIG. 7 is a timing chart of the material supply process.

FIG. 6 is a flowchart of the material supply process executed by the control section 7. FIG. 7 is a timing chart of the material supply process. The material supply process is repeatedly executed while the three-dimensional molded object 20 is being formed in the three-dimensional molding device 1. As shown in FIG. 7, at the start of the material supply process, the position of the sliding member 173 is the position of the third state shown in FIG. 5.

In step S10, the control section 7 determines whether or not the plasticization material 18 is detected in the coupling path 13a based on the output signal from the material sensor 23. When the ON signal is output from the material sensor 23, the control section 7 determines that the plasticization material 18 is detected in the coupling path 13a. When the control section 7 judges that the plasticization material 18 is detected, it ends the material supply process. When the control section 7 determines that the plasticization material 18 has not been detected, it drives the slide drive section 174 so that the state of the supply mechanism 17 transitions in the order of the first state and the second state in step S20, as shown in FIG. 7, to supply the plasticization material 18 to the coupling path 13a.

In step S20, as shown in FIG. 7, the control section 7 makes the time during which the supply mechanism 17 is in the first state longer than the time during which the supply mechanism 17 is in the second state. In this way, a state in which the through hole 173a of the sliding member 173 and the input port 120 overlap each other over a large area continues for a long time, and thus it is possible to increase the possibility that the plasticization material 18 which is about to fall from the input port 120 reliably falls. The time for setting the supply mechanism 17 to the first state is, for example, 1 to 3 seconds. As shown in FIG. 7, the control section 7 controls the slide drive section 174 so that the speed of moving the sliding member 173 to change the state of the supply mechanism 17 from the first state to the second state is greater than the speed of moving the sliding member 173 to change the state from the second state back to the first state. In this way, since the sliding member 173 can be quickly moved from the supply position to the intermediate stop position, by increasing the time of the first state, it is possible to increase the supply cycle of the plasticization material 18 while increasing the possibility that the plasticization material 18 drops.

In step S30, the detection section 7c of the control section 7 detects the remaining amount of the plasticization material 18 in the material reservoir 16 based on the torque of the motor 191 detected by the detection section 7c and determines whether or not the remaining amount is insufficient.

Figure 8:
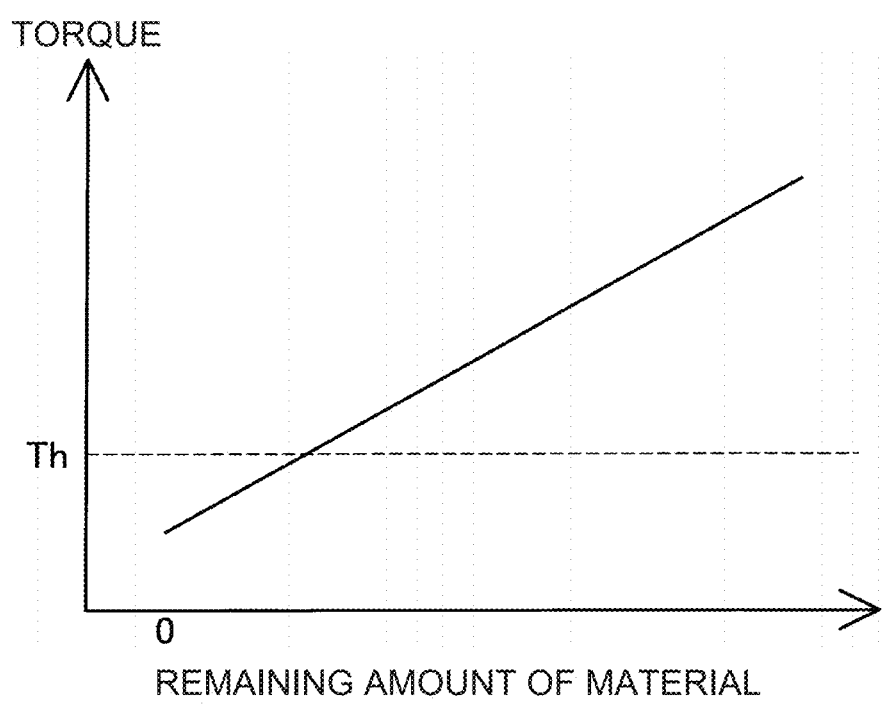
FIG. 8 is a graph showing the relationship between the remaining amount of the plasticization material and the torque of the motor.

FIG. 8 is a graph showing the relationship between the remaining amount of the plasticization material 18 and the torque of the motor 191. The control section 7 controls the sliding member 173 to move to a designated position at a designated speed. When the remaining amount of the plasticization material 18 in the material reservoir 16 is large, a large weight is applied to the sliding member 173 from above, so that the control section 7 applies a large current to the motor 191 to move the sliding member 173 to the specified position at the specified speed. Therefore, as shown in FIG. 8, as the amount of the plasticization material 18 in the material reservoir 16 increases, the torque of the motor 191 for moving the sliding member 173 increases. In step S30, when the torque of the motor 191 is equal to or less than the predetermined remaining amount threshold Th, the detection section 7c determines that the remaining amount of the plasticization material 18 in the material reservoir 16 is insufficient. The process of step S30 may be performed only immediately after the start of the molding of the three-dimensional molded object 20.

In step S30, if the remaining amount of the plasticization material 18 in the material reservoir 16 is determined to be insufficient, the control section 7, in step S40, performs a warning display on the display device 7b indicating that the remaining amount is insufficient and terminates the material supply process. The control section 7 may stop the molding process for molding the three-dimensional molded object 20 together with the execution of step S40. Note that control section 7 may report that the remaining amount is insufficient by sound.

In step S30, when the detection section 7c does not determine that the remaining amount of the plasticization material 18 in the material reservoir 16 is insufficient, in step S50, it determines whether or not interposition of the plasticization material 18 is detected during driving of the sliding member 173. The detection section 7c determines that the plasticization material 18 is interposed between the sliding member 173 and the guide case 29 when the torque of the motor 191 detected by the detection section 7c is equal to or greater than a predetermined interposition threshold. This interposition threshold is a value larger than the remaining amount threshold Th used in step S30.

When it is determined in step S50 that interposition of the plasticization material 18 has been detected, the control section 7 controls the slide drive section 174 to move the sliding member 173 in the reverse direction in step S60. At this time, the control section 7 drives the motor 191 with a torque larger than the torque for moving the sliding member 173 in step S20 to move the sliding member 173 in the opposite direction. In this way, it is possible to increase the possibility of eliminating the interposition of the plasticization material 18. In FIG. 7, a state of movement of the sliding member 173 after interposition was detected is indicated by a one-dot chain line. FIG. 7 shows a state in which an interposition was detected when the sliding member 173 was returned from the supply position to the intermediate stop position. The interposition is not limited to this situation and may also occur when advancing the sliding member 173 from the intermediate stop position to the supply position. The torque of the motor 191 for moving the sliding member 173 in step S20 is set to such a torque that the movement of the sliding member 173 is immediately stopped when an interposition occurs. If the sliding member 173 is moved with such torque in step S20, the possibility of eliminating an interposition can be increased by moving the sliding member 173 in the opposite direction in step S60.

In step S50, when it is not determined that interposition of the plasticization material 18 was detected, the control section 7 skips the process of step S60 described above. When the shaping of the three-dimensional molded object 20 is continued, the control section 7 repeatedly executes the series of material supply processes described above.

Figure 9:
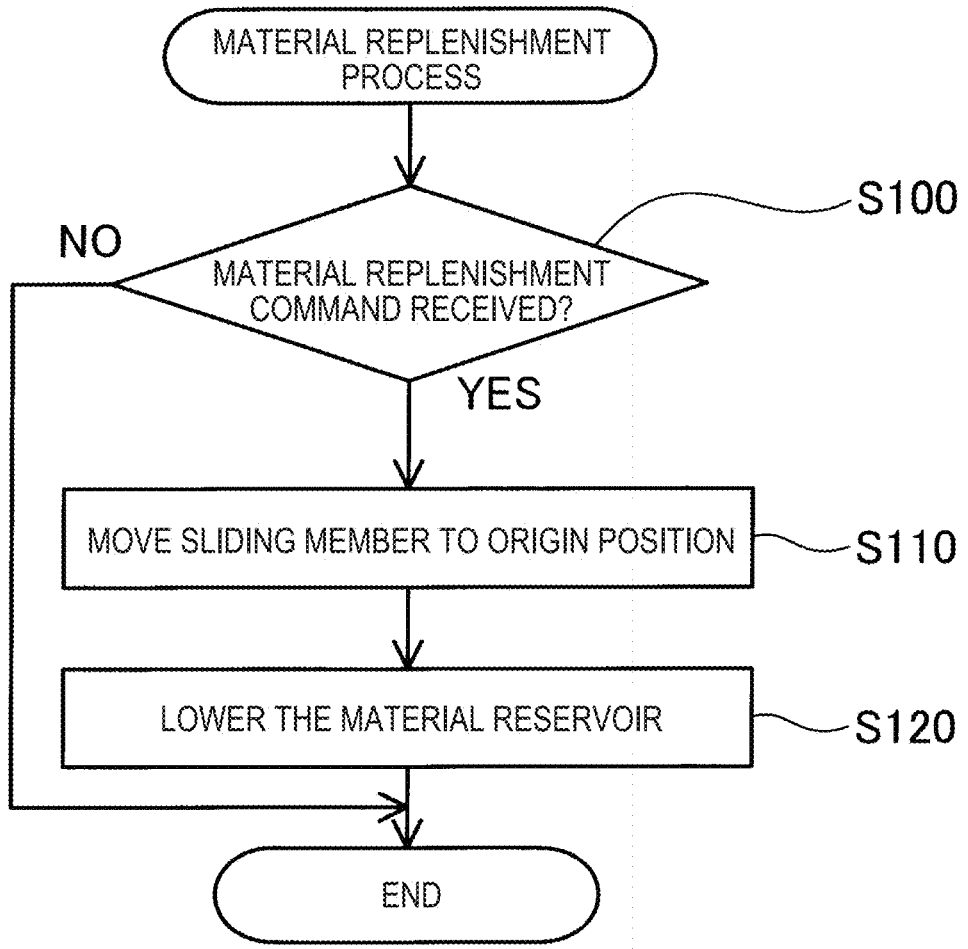
FIG. 9 is a flow chart of the material replenishment process.

FIG. 9 is a flowchart of a material replenishment process executed by the control section 7. This material replenishment process is repeatedly executed when the power supply of the three-dimensional molding device 1 is turned on, regardless of whether or not the above-described material supply process is executed.

In step S100, when the state of the supply mechanism 17 is the first state or the second state, the control section 7 determines whether or not a material replenishment command has been received from the operation panel 7a. That is, the control section 7 determines whether or not the operation button for material replenishment is operated by the user. In a case where the material replenishment command is received, in step S110, the control section 7 moves the sliding member 173 to the origin position, switches the supply mechanism 17 from the first state or the second state to the third state, and switches the state of the three-dimensional molding device 1 to the material replenishment mode. By this, the communication between the through hole 173a of the sliding member 173 and the input port 120 is released, and the dropping of the plasticization material 18 from the material supply device 12 is suppressed. FIG. 7 shows a state in which a material replenishment command is received while the supply mechanism 17 is in the second state, and the supply mechanism 17 is brought into the third state.

In step S120, the control section 7 controls the raising/lowering table 8 as the moving section to lower the positions of the ejection section 15 and the material supply device 12. This position is lower than the positions of the ejection section 15 and the material supply device 12 when the molding of the three-dimensional molded object 20 is completed.

If the control section 7 determines in step S100 that the material replenishment command has not been received, it skips the processes of step S110 and step S120 described above.

By executing the material replenishment process described above, when replenishing the plasticization material 18, the user can easily detach the material reservoir 16 and replenish the material reservoir 16 with the plasticization material 18. When the replenish of the plasticization material 18 to the material reservoir 16 is completed and the material reservoir 16 is attached to the supply mechanism 17, the user operates a predetermined operation button. Then, the control section 7 returns the position of the material supply device 12 to the original position and resumes the execution of the material supply process described above.

Figure 10:
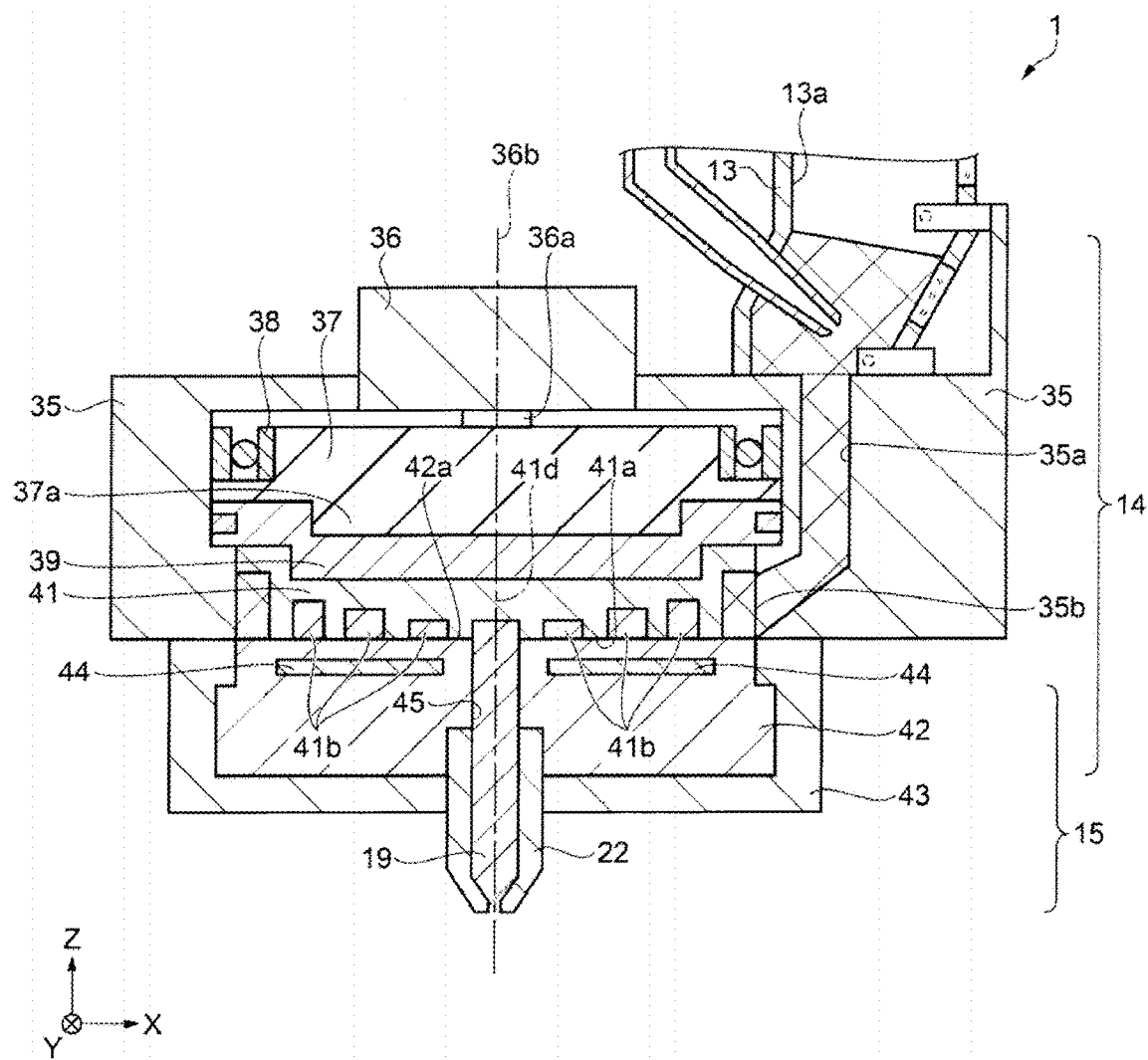
FIG. 10 is a side cross-sectional view schematically showing the structure of the plasticizing section.

FIG. 10 is a side cross-sectional view schematically showing the structure of the plasticizing section 14. The plasticizing section 14 includes a screw case 35. The inside of the screw case 35 is hollow. A motor 36 is installed at the +Z direction side of the screw case 35. The control section 7 controls the rotation angle, the rotation speed, the timing to start rotation, and the timing to stop rotation of the motor 36.

A deceleration device 37 is coupled to a rotation shaft 36a of the motor 36. When the rotation shaft 36a rotates at a high speed, an outer circumferential side of the deceleration device 37 rotates at a reduced low speed. The outer circumferential side of the deceleration device 37 which rotates at a low speed serves as an output shaft 37a. A bearing 38 is provided on the outer circumferential side of the deceleration device 37. The bearing 38 is arranged between the screw case 35 and the deceleration device 37. The bearing 38 rotatably supports the deceleration device 37.

A screw support section 39 is installed on the output shaft 37a of the deceleration device 37. A flat screw 41 is installed on the screw support section 39. The flat screw 41 rotates in synchronization with the output shaft 37a. The flat screw 41 is rotated by the motor 36. A screw rotation center 41d, which is the rotation center of the flat screw 41, is coaxial with a motor rotation center 36b, which is the rotation center of the motor 36.

Figure 11:
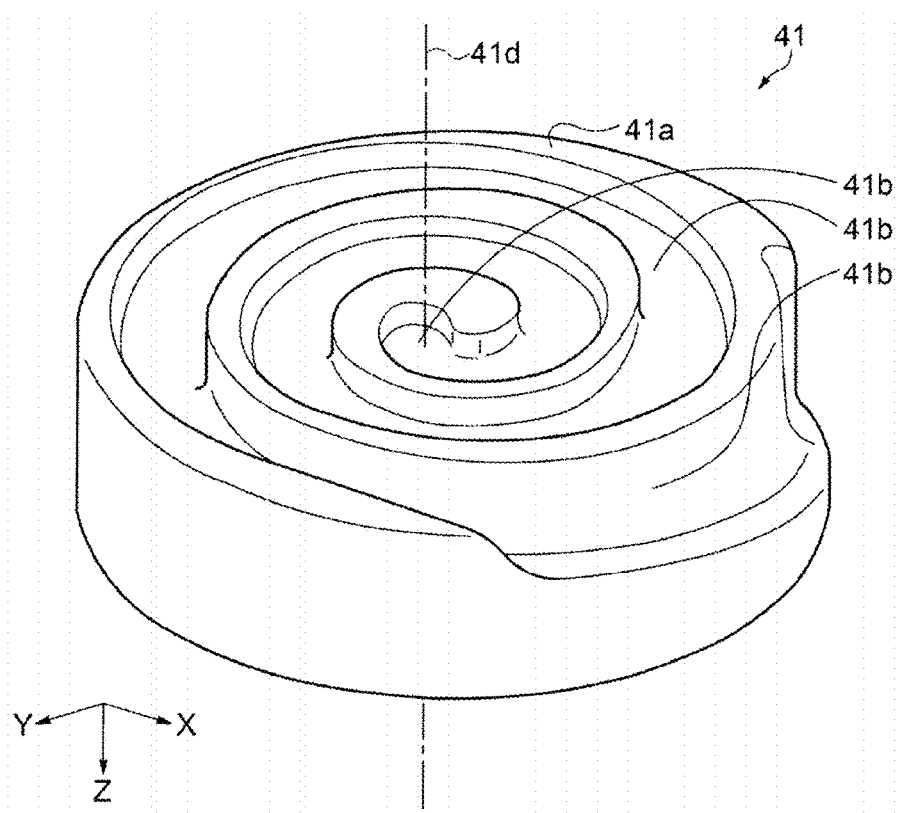
FIG. 11 is a schematic perspective view showing the configuration of a flat screw.

FIG. 11 is a schematic perspective view showing the configuration of the flat screw 41. The flat screw 41 has a groove forming surface 41a in which a helical-state shape groove 41b is formed. The flat screw 41 has a substantially cylindrical shape in which the size in the direction of the rotation shaft 36a is smaller than the size in the direction orthogonal to the direction of the rotation shaft 36a. In the shown example, one spiral-state shape groove 41b is provided. The number of the grooves 41b is not particularly limited. Although not shown, two or more grooves 41b may be provided. The shape of the groove 41b is not limited to a spiral-state shape and may be a helical-state shape or an involute curve-state shape. The groove 41b may have a shape extending to draw an arc from the central portion toward the outer circumference.

As shown in FIG. 10, the screw case 35 houses the deceleration device 37, the screw support section 39, and the flat screw 41. The screw case 35 includes a supply path 35a coupled to the coupling tube 13. The supply path 35a continues from the coupling tube 13 to the flat screw 41. An opening of the supply path 35a on the flat screw 41 side is a passage port 35b. The screw case 35 includes the passage port 35b through which the plasticization material 18 passes toward the flat screw 41.

A barrel 42 is installed on the −Z direction side of the flat screw 41. A barrel case 43 for housing the barrel 42 is installed on the −Z direction side of the screw case 35. The flat screw 41 rotates with respect to the barrel 42.

The barrel 42 has a facing surface 42a that faces the groove forming surface 41a of the flat screw 41. A heater 44 is installed inside the barrel 42 at a place facing the groove 41b. The heater 44 heats the plasticization material 18 supplied between the groove forming surface 41a and the facing surface 42a. The heated plasticization material 18 is plasticized into the molding material 19. The barrel 42 includes a communication hole 45 into which the molding material 19 is obtained by plasticizing the plasticization material 18 flows.

Figure 12:
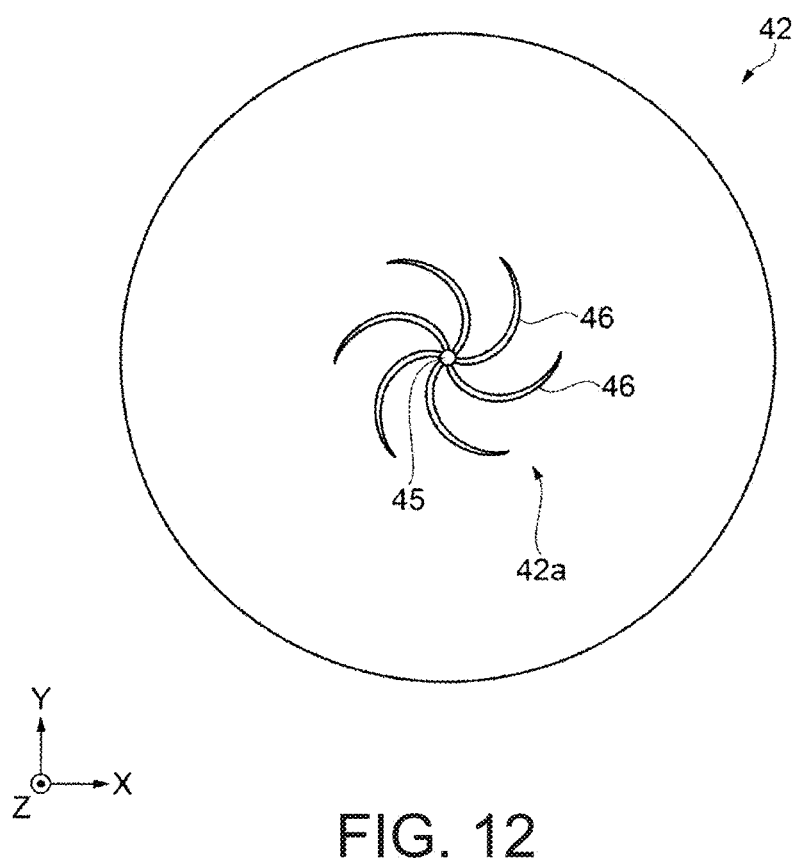
FIG. 12 is a schematic plan view showing the configuration of a barrel.

FIG. 12 is a schematic plan view showing the configuration of the barrel 42. A plurality of guide grooves 46 is formed around the communication hole 45 in the facing surface 42a of the barrel 42. Each of the guide grooves 46 has one end coupled to the communication hole 45 and extends in a spiral-state shape from the communication hole 45 toward the outer circumferential of the facing surface 42a. Each of the guide grooves 46 guides the molding material 19 to the communication hole 45. One end of the guide groove 46 may not be coupled to the communication hole 45. The guide groove 46 may not be formed on the facing surface 42a.

As shown in FIG. 10, the depth of the groove 41b in the flat screw 41 is shallower on the side closer to the screw rotation center 41d than on the outer circumferential side. Therefore, the cross-sectional area of the groove 41b is smaller on the side closer to the screw rotation center 41d than on the outer circumferential side. The molding material 19 in the groove 41b has a high pressure on the side of the screw rotation center 41d and is pushed out to the communication hole 45. The flat screw 41 functions as a pump that moves the molding material 19.

In the present embodiment, since the plasticizing section 14 is configured to include the flat screw 41 and the barrel 42, the plasticizing section 14 can be reduced in size compared to a configuration in which the plasticizing section 14 is configured to include an inline screw. It is also possible to configure the plasticizing section 14 with an inline screw.

According to the first embodiment described above, the through hole 173a of the sliding member 173 provided in the material supply device 12 communicates with the input port 120 for supplying the plasticization material 18 to the outside in both the first state and the second state shown in FIG. 5. In other words, in both the first state in which the plasticization material 18 is supplied to the outside and the second state in which the plasticization material 18 is not supplied to the outside, the through hole 173a communicates with the input port 120. Therefore, when the plasticization material 18 is supplied to the outside, interposition of the plasticization material 18 in the sliding member 173 is suppressed, and the occurrence of a malfunction in the material supply can be suppressed.

In the present embodiment, the through hole 173a of the sliding member 173 is a hole surrounded by a wall surface, and as shown in FIG. 5, the area where the through hole 173a and the input port 120 overlap in the first state is larger than the area where the through hole 173a and the input port 120 overlap in the second state. Therefore, in the first state, the plasticization material 18 is easily discharged to the outside.

In this embodiment, as shown in FIG. 4, the angle D formed by the virtual line VL connecting the edge of the supply port 16a and the edge of the input port 120 at the shortest distance and a horizontal plane is set to be equal to or smaller than the angle of repose of the plasticization material 18. Therefore, in the second state in which the plasticization material 18 is not supplied to the outside, it is possible to prevent the plasticization material 18 from being unintentionally discharged from the input port 120.

In the present embodiment, the remaining amount of the plasticization material 18 in the material reservoir 16 is detected based on the torque of the motor 191 detected by the detection section 7c. Therefore, it is not necessary to separately provide a sensor for detecting the remaining amount of the plasticization material 18 in the material reservoir 16.

In the present embodiment, as shown in FIG. 7, after a predetermined time has elapsed in the first state, the control section 7 controls the slide drive section 174 to switch the supply mechanism 17 from the first state to the second state.

Therefore, in the first state in which the plasticization material 18 is supplied, it is possible to increase the possibility that the plasticization material 18 reliably falls from the input port 120.

In the present embodiment, the control section 7 controls the slide drive section 174 so that the speed at which the sliding member 173 is moved from the first state to the second state is higher than the speed at which the sliding member 173 is moved from the second state to the first state. Therefore, even when the time during which the first state is maintained is long, the supply cycle of the plasticization material 18 can be accelerated.

In the embodiment, when the control section 7 causes the supply mechanism 17 to transition from the first state to the second state, the control section 7 controls the slide drive section 174 to drive the motor 191 with the first torque, thereby moving the sliding member 173 with the first force. Then, when the detection section 7c detects that an interposition has occurred in the sliding member 173 while moving the sliding member 173 with the first force, the supply mechanism 17 is shifted from the second state to the first state. When it causes the supply mechanism 17 to transition from the second state to the first state, it controls the slide drive section 174 to drive the motor 191 with a second torque greater than the first torque, thereby moving the sliding member 173 with a second force greater than the first force. Therefore, even when interposition of the plasticization material 18 in the sliding member 173 occurs, the possibility of eliminating the interposition can be increased.

In the present embodiment, the through hole 173a of the sliding member 173 is a hole surrounded by a wall surface, and when the state of the supply mechanism 17 is the third state, the through hole 173a and the supply port 16a communicate with each other, and the through hole 173a and the input port 120 do not communicate with each other. Therefore, in the third state, it is possible to suppress the plasticization material 18 from flowing out from the through hole 173a to the input port 120.

In the present embodiment, when the control section 7 receives a material replenishment command, the control section 7 switches the supply mechanism 17 from the first state or the second state to the third state and lowers the position of the material reservoir 16. Therefore, the user can easily replenish the material reservoir 16 with the plasticization material 18.

In the present embodiment, as shown in FIG. 4, the wall surface of the through hole 173a in the −X direction is inclined downward. Therefore, when the sliding member 173 is moved in the +X direction, it is possible to suppress that the sliding member 173 stops moving because the plasticization material 18 gets stuck bridging between the through hole 173a and the input port 120.

Figure 13:
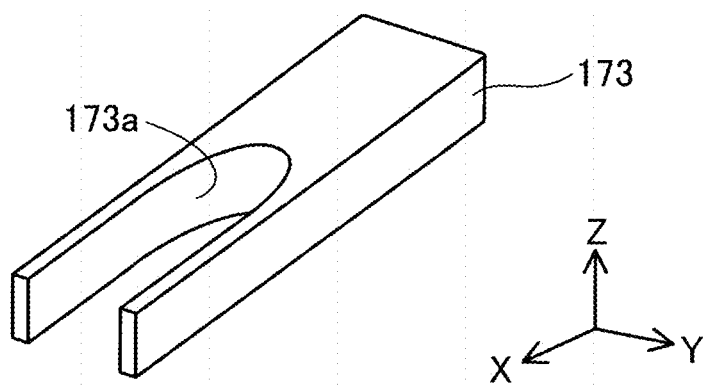
FIG. 13 is a perspective view showing another form of the sliding member.

FIG. 13 is a perspective view showing another form of the sliding member 173. In the first embodiment described above, the through hole 173a of the sliding member 173 is configured as a hole surrounded by wall surfaces on all four sides. On the other hand, as shown in FIG. 13, the through hole 173a may be open on the +X direction side. In this way, it is possible to suppress the plasticization material 18 from interposing by the wall surface on the +X direction side when the sliding member 173 is moved in the −X direction. In a case where the +X direction side of the sliding member 173 is open, a lid for closing the open portion of the through hole 173a on the +X direction side in the third state may be attached to the guide case 29.

B. Second Embodiment

In the first embodiment described above, the material supply device 12 is provided in the three-dimensional molding device 1. On the other hand, in the second embodiment, a material supply device 69 is provided in a molding device 50. The molding device 50 of the second embodiment is an injection molding device.

Figure 14:
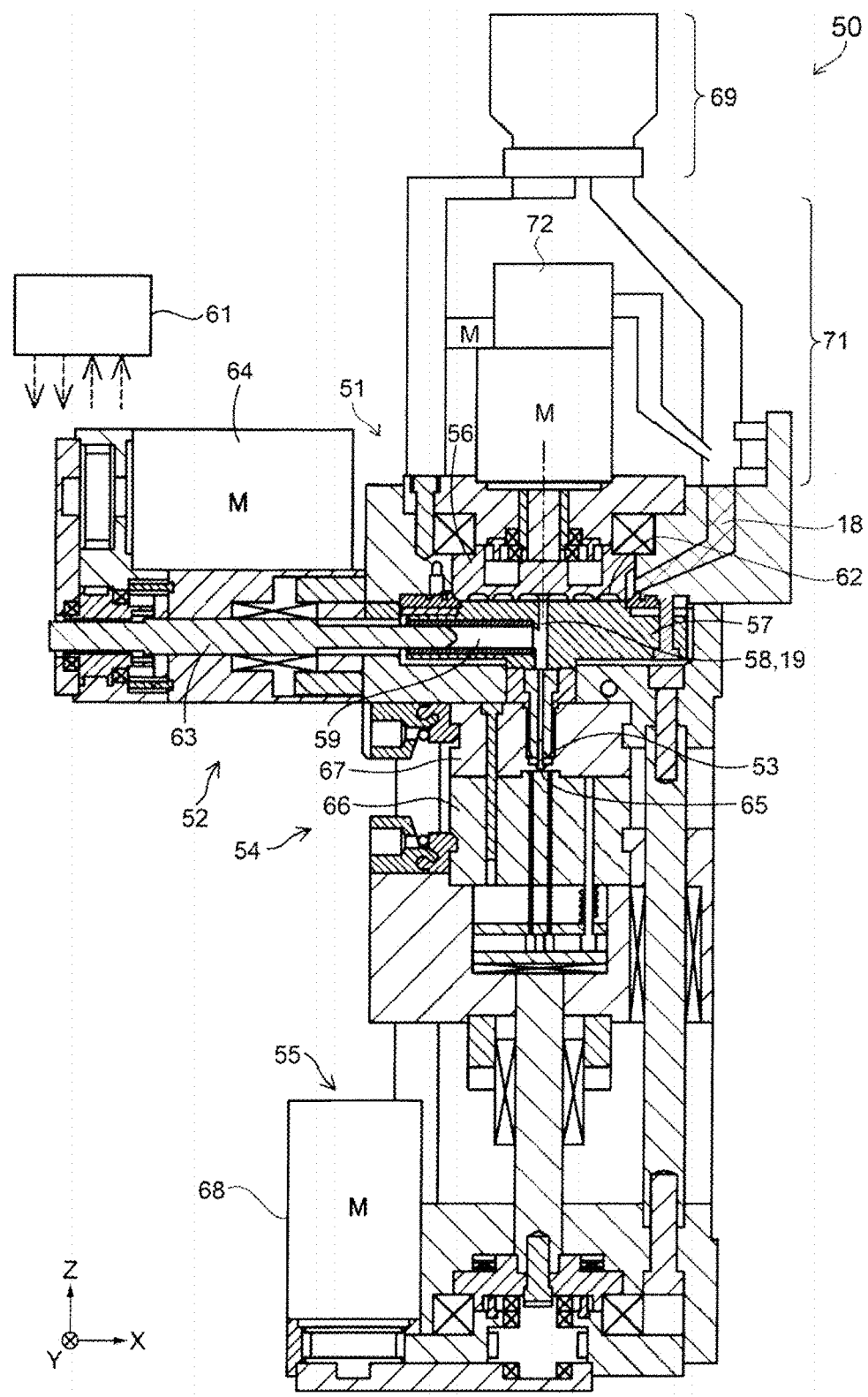
FIG. 14 is a schematic diagram showing a configuration of a molding device.

FIG. 14 is a schematic diagram showing a configuration of the molding device 50. The molding device 50 includes a plasticizing device 51, an injection control mechanism 52, a nozzle 53, a molding die 54, and a molding die clamping device 55. The configuration of the plasticizing device 51 is the same as the configuration of the plasticizing device 21 of the first embodiment.

The plasticizing device 51 includes a flat screw 56 and a barrel 57. An injection cylinder 59 is coupled to a communication hole 58 of the barrel 57. Under the control of a control section 61, the plasticizing device 51 plasticizes the plasticization material 18 supplied to a groove section 62 of the flat screw 56, generates the paste-like molding material 19 having fluidity, and guides it from the communication hole 58 to the injection control mechanism 52.

In addition, the plasticizing device 51 includes the material supply device 69, a coupling tube 71, and a blower section 72. The material supply device 69, the coupling tube 71, and the blower section 72 correspond to the material supply device 12, the coupling tube 13, and the blower section 25 of the first embodiment, respectively.

The injection control mechanism 52 includes the injection cylinder 59, a plunger 63, and a plunger drive section 64. The injection control mechanism 52 injects the molding material 19 in the injection cylinder 59 into a cavity 65. The injection control mechanism 52 controls the injection amount of the molding material 19 injected from the nozzle 53 under the control of the control section 61. The injection cylinder 59 is a substantially cylindrical member coupled to the communication hole 58 of the barrel 57 and has the plunger 63 inside. The plunger 63 slides inside the injection cylinder 59 and pumps the molding material 19 in the injection cylinder 59 to the nozzle 53 coupled to the plasticizing device 51. The plunger 63 is driven by the plunger drive section 64, which is configured by a motor.

The molding die 54 is provided with a movable molding die 66 and a fixed molding die 67. The movable molding die 66 and the fixed molding die 67 are provided facing each other, and the cavity 65, which is a space corresponding to the shape of the molded article, is formed therebetween. The molding material 19 pumped by the injection control mechanism 52 is injected into the cavity 65 through the nozzle 53.

The molding die clamping device 55 includes a molding die drive section 68. The molding die drive section 68 performs opening and closing of the movable molding die 66 and the fixed molding die 67. Under the control of the control section 61, the molding die clamping device 55 drives the molding die drive section 68 to move the movable molding die 66 to open and close the movable molding die 66 and the fixed molding die 67.

The molding device 50 includes the nozzle 53 that injects the molding material 19 supplied from the plasticizing device 51 toward the molding die 54.

The molding device 50 of the second embodiment described above is provided with the same material supply device 69 as that of the first embodiment. Therefore, as in the first embodiment, it is possible to suppress the occurrence of a malfunction in the material supply from the material supply device 69 to the plasticizing device 51.

C. Other Embodiments (C1) In the above-described embodiment, the movement speed and the movement amount of the sliding member 173 and the torque of the motor 191 may be changeable according to the type of the plasticization material 18. For example, the control section 7 changes these parameters to values determined in advance by simulation, experiment, or the like in accordance with the type of the plasticization material 18 designated by the user. In this way, the supply mechanism 17 can be driven according to the type of the plasticization material 18.

(C2) In the first embodiment, the X-Y table 3 moves the stage 6 in the X direction and the Y direction, and the raising/lowering table 8 moves the ejection section 15 in the Z direction. Alternatively, a raising/lowering table for moving the stage 6 in the Z direction and an X-Y table for moving the ejection section 15 in the X direction and the Y direction may be provided. Alternatively, an XYZ table that moves the ejection section 15 in the X direction, the Y direction, and the Z direction may be provided, and the stage 6 not moved. Alternatively, an XYZ table that moves the stage 6 in the X direction, the Y direction, and the Z direction may be provided, and the ejection section 15 not moved. With any of the configurations, the three-dimensional molded object 20 can be formed on the stage 6.

(C3) In the above embodiment, the side surface on the −X direction side of the through hole 173*a* of the sliding member 173 is curved in a semicircular arc shape when viewed in the −Z direction. In contrast, the side surface of the −X direction side of the sliding member 173, when viewed in the −Z direction, may be a straight line intersecting the X direction.

(C4) In the above embodiment, the three-dimensional molding device 1 and the molding device 50 include the blower sections 25 and 72. In contrast, the three-dimensional molding device 1 and the molding device 50 may not include the blower sections 25 and 72.

(C5) In the above embodiment, the supply mechanism 17 switches between the first state, the second state, and the third state. In contrast, for example, in a configuration in which the material reservoir 16 and the material supply device 12 cannot be detached from the unit-support section 9, the supply mechanism 17 may not be switched to the third state.

(C6) In the above embodiment, the angle D formed by the virtual line VL connecting the edge of the supply port 16*a* and the edge of the input port 120 with the shortest distance and the horizontal plane is set to be equal to or less than the angle of repose of the plasticization material 18. On the other hand, it is also possible to set the angle D to an angle exceeding the angle of repose.

(C7) In the above-described embodiment, the control section 7 detects the remaining amount of the plasticization material 18 in the material reservoir 16 based on the torque of the motor 191 of the slide drive section 174. On the other hand, the material reservoir 16 may include a remaining amount detecting sensor, and the control section 7 may detect the remaining amount of the plasticization material 18 using the sensor.

(C8) In the above embodiment, the material supply process shown in FIG. 6 is performed. In this material supply process, either one or both of the processes of step S30 and step S40 for detecting the remaining amount and displaying the warning, and the processes of step S50 and step S60 for detecting and releasing interpositions may be omitted.

(C9) In the above embodiment, when the supply mechanism 17 is in the first state, the control section 7 switches the supply mechanism 17 from the first state to the second state after a predetermined time has elapsed. In contrast, the control section 7 may switch the supply mechanism 17 from the first state to the second state without waiting for the elapse of time.

(C10) In the above-described embodiment, the control section 7 controls the slide drive section 174 such that the speed of moving the sliding member 173 from the first state to the second state is higher than the speed of moving the sliding member 173 from the second state to the first state. On the other hand, the control section 7 can also control the slide drive section 174 so that the speed at which the sliding member 173 is moved from the first state to the second state is lower than the speed at which the sliding member 173 is moved from the second state to the first state, or so that these speeds are the same.

(C11) In the above embodiment, the control section 7 executes the material replenishment process shown in FIG. 9. On the other hand, the control section 7 may omit the execution of the material replenishment process.

(C12) In the above embodiment, the sliding member 173 may be replaceable according to the type of the plasticization material 18. For example, when the plasticization material 18 having a small frictional resistance is used, the sliding member 173 having a large inclination angle of the wall surface on the −X direction side may be used. In this way, when the friction coefficient of the plasticization material 18 is small, the torque of the motor 191 for moving the sliding member 173 can be increased, and thus the remaining amount of the plasticization material 18 in the material reservoir 16 can be easily detected.

D. Other Forms

The present disclosure is not limited to the above described embodiments and can be realized in various configurations without departing from the spirit thereof. For example, the technical features of the embodiments corresponding to the technical features in each aspect described below can be appropriately replaced or combined in order to solve a part or all of the problems described above or to achieve a part or all of the effects described above. Unless the technical features are described as essential in the present specification, the technical features can be appropriately deleted.

(1) According to a first aspect of the present disclosure, there is provided a material supply device that includes an input port and configured to supply a stored plasticization material from the input port to the outside. The material supply device includes a material reservoir that has a supply port provided at a position not overlapping with the input port in a supply direction of the plasticization material and that stores the plasticization material and a supply mechanism that adjusts the amount of plasticization material supplied from the input port to the outside, wherein the supply mechanism includes a sliding member that is provided between the supply port and the input port and in which is provided a through hole through which the plasticization material passes, and a slide drive section that slides the sliding member along an intersecting direction that intersects the supply direction, the supply mechanism switches to a first state in which the plasticization material is supplied to the outside and to a second state in which the plasticization material is not supplied to the outside, the through hole of the sliding member communicates with the input port in both the first state and the second state, and a distance between the through hole and the supply port in the intersecting direction decreases in the order of the first state and the second state.

According to such a configuration, in both states of the first state in which the plasticization material is supplied to the outside and the second state in which the plasticization material is not supplied to the outside, the through hole of the sliding member communicates with the input port for supplying the plasticization material to the outside. Therefore, it is possible to suppress the plasticization material from interposing in the sliding member and to suppress the occurrence of a malfunction in the material supply.

(2) In the above-described aspect, the through hole of the sliding member is a hole surrounded by a wall surface, and an area where the through hole and the input port overlap in the first state may be larger than an area where the through hole and the input port overlap in the second state. According to such a configuration, the plasticization material is easily discharged to the outside in the first state.

(3) In the above aspect, an angle formed by a virtual line connecting an edge of the supply port and an edge of the input port at the shortest distance and a horizontal plane may be equal to or less than an angle of repose of the plasticization material. According to such a configuration, in the second state in which the plasticization material is not supplied to the outside, it is possible to suppress the discharge of the plasticization material from the input port.

(4) In the above-described aspect, the material supply device may further include a detection section that detects torque of the motor and detects a remaining amount of the plasticization material in the material reservoir based on the torque, wherein the slide drive section has a motor for driving the sliding member. According to such a configuration, it is possible to detect the material of the plasticization material based on the torque of the motor, and it is not necessary to separately provide a sensor for detecting the remaining amount of plasticization material.

(5) In the above-described aspect, it may further include a control section configured to control the slide drive section to switch the supply mechanism from the first state to the second state after a predetermined time elapses in the first state. According to such a configuration, in the first state, it is possible to increase a possibility that the plasticization material normally falls from the input port.

(6) In the above-described aspect, it may further include a control section configured to control the slide drive section such that a speed at which the sliding member is moved from the first state to the second state is higher than a speed at which the sliding member is moved from the second state to the first state. According to such a configuration, even when the time during which the first state is maintained is long, the supply cycle of the plasticization material can be accelerated.

(7) In the above-described aspect, it further include a detection section that detects that an interposition has occurred in the sliding member and a control section configured to control the slide drive section, wherein the control section may be configured to when the supply mechanism is shifted from the first state to the second state, control the slide drive section to move the sliding member with a first force and when the detection section detects that an interposition has occurred at the sliding member while the sliding member is being moved by the first force, move the sliding member by a second force larger than the first force and shift the supply mechanism from the second state to the first state. According to such a configuration, even when an interposition of the plasticization material in the sliding member occurs, the possibility of eliminating the biting can be increased.

(8) In the above-described aspect, the through hole of the sliding member is a hole surrounded by a wall surface, the supply mechanism switches among the first state, the second state, and a third state, a distance between the through hole and the supply port in the intersecting direction decreases in order of the first state, the second state, and the third state, and the third state may be a state in which the through hole and the supply port communicate with each other and the through hole and the input port do not communicate with each other. According to such a configuration, in the third state, it is possible to suppress the outflow of the plasticization material from the through hole to the input port.

(9) In the above-described aspect, it may further includes a moving section that moves the position of the material reservoir along a vertical direction and a control section configured to, when the control section receives a material replenishment command while the state of the supply mechanism is in the first or second state, switch the supply mechanism from the first or second state to the third state and lower the position of the material reservoir by controlling the moving section. According to such a configuration, the user can easily replenish the material reservoir with the plasticization material.

The present disclosure is not limited to the form of the material supply device described above, plasticizing device, three-dimensional molding device, molding device, such as a material supply method, it is possible to realize by various forms.

What is claimed is:

1. A material supply device including an input port and configured to supply a stored plasticization material from the input port to outside, the material supply device comprising: a material reservoir that has a supply port provided at a position not overlapping with the input port in a supply direction of the plasticization material and that stores the plasticization material and a supply mechanism that adjusts the amount of plasticization material supplied from the input port to the outside, wherein the supply mechanism includes a sliding member that is provided between the supply port and the input port and in which is provided a through hole through which the plasticization material passes, and a slide drive section that slides the sliding member along an intersecting direction that intersects the supply direction, the supply mechanism switches to a first state in which the plasticization material is supplied to the outside and to a second state in which the plasticization material is not supplied to the outside, the through hole of the sliding member communicates with the input port and the supply port in both the first state and the second state, and a distance between the through hole and the supply port in the intersecting direction decreases in the order of the first state and the second state.

2. The material supply device according to claim 1, wherein
the through hole of the sliding member is a hole that is surrounded by a wall surface and
an area where the through hole and the input port overlap in the first state is larger than an area where the through hole and the input port overlap in the second state.

3. The material supply device according to claim 1, wherein
an angle formed by a virtual line connecting an edge of the supply port and an edge of the input port at the shortest distance and a horizontal plane is equal to or less than an angle of repose of the plasticization material.

4. The material supply device according to claim 1, further comprising:
a detection section that detects torque of the motor and that detects a remaining amount of the plasticization material in the material reservoir based on the torque, wherein
the slide drive section has a motor for driving the sliding member.

5. The material supply device according to claim 1, further comprising:
a control section configured to control the slide drive section to switch the supply mechanism from the first state to the second state after a predetermined time elapses in the first state.

6. The material supply device according to claim 1, further comprising:
a control section configured to control the slide drive section such that a speed at which the sliding member is moved from the first state to the second state is higher than a speed at which the sliding member is moved from the second state to the first state.

7. The material supply device according to claim 1, further comprising:
a detection section that detects that an interposition has occurred in the sliding member and
a control section configured to control the slide drive section, wherein
the control section is configured to
when the supply mechanism is shifted from the first state to the second state, control the slide drive section to move the sliding member with a first force and
when the detection section detects that an interposition has occurred at the sliding member while the sliding member is being moved by the first force, move the sliding member by a second force larger than the first force and shift the supply mechanism from the second state to the first state.

8. The material supply device according to claim 1, wherein
the through hole of the sliding member is a hole that is surrounded by a wall surface,
the supply mechanism switches among the first state, the second state, and a third state,
a distance between the through hole and the supply port in the intersecting direction decreases in the order of the first state, the second state, and the third state, and
the third state is a state in which the through hole and the supply port communicate with each other and the through hole and the input port do not communicate with each other.

9. The material supply device according to claim 8, further comprising:
a moving section that moves the position of the material reservoir along a vertical direction and
a control section configured to, when the control section receives a material replenishment command while the state of the supply mechanism is in the first or second state, switch the supply mechanism from the first or second state to the third state and lower the position of the material reservoir by controlling the moving section.

\* \* \* \* \*